US010060661B2

(12) United States Patent
Abastari et al.

(10) Patent No.: US 10,060,661 B2
(45) Date of Patent: Aug. 28, 2018

(54) ACCUMULATOR AND REFRIGERATION APPARATUS INCLUDING THE SAME

(71) Applicant: Mitsubishi Electric Corporation, Tokyo (JP)

(72) Inventors: Abastari, Tokyo (JP); Satoru Ue, Tokyo (JP); Tomotaka Ishikawa, Tokyo (JP); Kenichi Hata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 15/106,333

(22) PCT Filed: Feb. 28, 2014

(86) PCT No.: PCT/JP2014/055164
§ 371 (c)(1),
(2) Date: Jun. 20, 2016

(87) PCT Pub. No.: WO2015/129047
PCT Pub. Date: Sep. 3, 2015

(65) Prior Publication Data
US 2017/0051956 A1 Feb. 23, 2017

(51) Int. Cl.
*F25B 43/00* (2006.01)
*B01D 19/00* (2006.01)
*F25B 31/00* (2006.01)

(52) U.S. Cl.
CPC ........ *F25B 43/006* (2013.01); *B01D 19/0057* (2013.01); *F25B 31/004* (2013.01); *F25B 43/00* (2013.01); *F25B 2400/075* (2013.01)

(58) Field of Classification Search
CPC ..... F25B 43/00; F25B 43/006; B01D 19/0057
See application file for complete search history.

(56) References Cited

U.S. PATENT DOCUMENTS 3,304,697 A 2/1967 Ramsey
3,600,904 A * 8/1971 Tilney .................. F25B 41/065
62/136
(Continued)

FOREIGN PATENT DOCUMENTS

CN 101086402 A 12/2007
CN 102141328 A 8/2011
(Continued)

OTHER PUBLICATIONS

International Search Report of the International Searching Authority dated Jun. 3, 2014 for the corresponding International application No. PCT/JP2014/055164 (and English translation).
(Continued)

*Primary Examiner* — Cassey D Bauer
(74) *Attorney, Agent, or Firm* — Posz Law Group, PLC (57) ABSTRACT

An accumulator that is used in a refrigeration apparatus including a plurality of compressors and is provided for the plurality of compressors, the accumulator including an inlet pipe that penetrates a cylindrical container perpendicularly to a central axis of the cylindrical container and conveys gas-liquid mixed refrigerant into the container and a plurality of outlet pipes connected to respective suction sides of the plurality of compressors, wherein the plurality of outlet pipes each have one end located in the container and forming outlet port for conveying gas refrigerant in the container toward the plurality of compressors, and wherein the outlet port of each of the plurality of outlet pipes is concentrated in a central part of the container.

11 Claims, 7 Drawing Sheets

(56) References Cited

U.S. PATENT DOCUMENTS

| | | | | | |
|---|---|---|---|---|---|
| 5,184,479 | A | * | 2/1993 | Koberstein | ........... F25B 43/006 210/282 |
| 2004/0099008 | A1 | * | 5/2004 | Lee | ........................ F25B 13/00 62/503 |

FOREIGN PATENT DOCUMENTS

| | | | | | |
|---|---|---|---|---|---|
| CN | 102235783 | A | | 11/2011 | |
| CN | 103363738 | A | | 10/2013 | |
| CN | 204555458 | U | | 8/2015 | |
| JP | 04-90863 | U | | 8/1992 | |
| JP | H06-18865 | U | | 3/1994 | |
| JP | H06-221695 | A | | 8/1994 | |
| JP | 08-200892 | A | | 8/1996 | |
| JP | 408200892 | | * | 8/1996 | .............. F25B 43/00 |
| JP | H11-108506 | A | | 4/1999 | |
| JP | 2006-112672 | A | | 4/2006 | |

OTHER PUBLICATIONS

Office Action dated Apr. 27, 2017 issued in corresponding CN patent application No. 201480073018.2 (and English translation).
Office Action dated Nov. 16, 2017 corresponding to CN patent application No. 201480073018.2 (and English translation attached).
Extended EP Search Report dated Oct. 5, 2017 corresponding to EP patent application No. 14883889.9.

* cited by examiner

ACCUMULATOR AND REFRIGERATION APPARATUS INCLUDING THE SAME

CROSS REFERENCE TO RELATED APPLICATION

This application is a U.S. national stage application of PCT/JP2014/055164 filed on Feb. 28, 2014, the contents of which are incorporated herein by reference.

TECHNICAL FIELD

The present invention relates to an accumulator of a refrigeration apparatus provided with a plurality of compressors and a refrigeration apparatus including the accumulator.

BACKGROUND

Conventionally, there has been an accumulator that is used in a refrigeration apparatus including a plurality of compressors and is provided for the plurality of compressors (see Patent Literature 1, for example). This accumulator includes one inlet pipe and a plurality of outlet pipes connected to respective suction sides of the plurality of compressors. Gas-liquid mixed refrigerant in a mixed state of refrigerant and oil is flowing into the inlet pipe. The inlet pipe is inserted from an upper surface of a container of the accumulator, and is installed such that a part of the pipe located inside the accumulator is inclined to the inner circumferential surface of the container.

With the inlet pipe thus disposed, the accumulator of Patent Literature 1 causes a swirl flow of the gas-liquid mixed refrigerant in the container, and makes liquid in this swirl flow adhere to the inner circumferential surface of the container with centrifugal force so as to separate liquid and gas contained in the gas-liquid mixed refrigerant.

Patent Literature

Patent Literature 1: Japanese Unexamined Patent Application Publication No. 2006-112672 (page 4)

In the configuration of Patent Literature 1, the flow of the gas-liquid mixed refrigerant flowing into the container is the swirl flow. The swirl flow hits against the liquid surface of the refrigerant stored in the container, thereby causing turbulence on the liquid surface, a swirl (vortex), or the like. Such occurrence of turbulence on the liquid surface and a vortex results in a problem of variations in flow rates of gas refrigerant flowing out of the outlet pipes.

SUMMARY

The present invention has been made in view of such circumstances. An object of the present invention is to provide an accumulator capable of reducing the variations in the outflow rates of the gas refrigerant flowing out of the plurality of outlet pipes and a refrigeration apparatus including this accumulator.

An accumulator according to the present invention is an accumulator that is used in a refrigeration apparatus including a plurality of compressors and is provided for the plurality of compressors, the accumulator including an inlet pipe that penetrates a cylindrical container perpendicularly to a central axis of the cylindrical container and conveys gas-liquid mixed refrigerant into the container and a plurality of outlet pipes connected to respective suction sides of the plurality of compressors, wherein the plurality of outlet pipes each have one end located in the container and forming an outlet port for conveying gas refrigerant in the container toward the plurality of compressors, and wherein the outlet port of each of the plurality of outlet pipes is concentrated in a central part of the container.

A refrigeration apparatus according to the present invention includes the above-described accumulator.

According to the present invention, it is possible to reduce the variations in the outflow rates of the gas refrigerant flowing out of the plurality of outlet pipes.

DETAILED DESCRIPTION

Embodiment 1 to Embodiment 3 of the present invention will be described in detail below with reference to FIG. 1 to FIG. 12.

Embodiment 1

Figure 1:
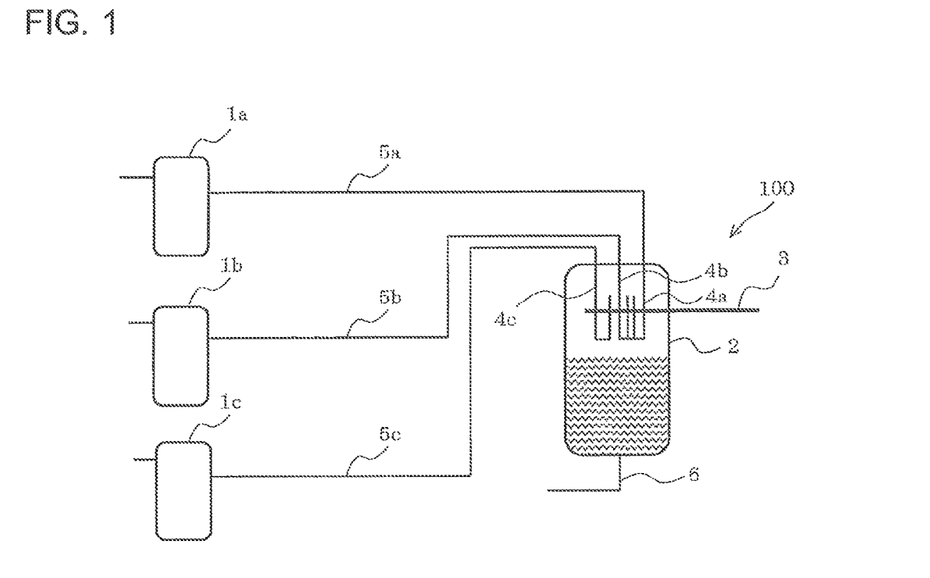
FIG. 1 is a diagram illustrating a configuration of a refrigeration apparatus provided with an accumulator 100 according to Embodiment 1 of the present invention.

FIG. 1 is a diagram illustrating a configuration of a refrigeration apparatus provided with an accumulator 100 according to Embodiment 1 of the present invention. Hereinafter, elements assigned with identical signs in FIG. 1 and the subsequent drawings are identical or correspond to one another, which applies to the entire text of the specification. Further, forms of elements described in the entire text of the specification are only illustrative, and elements are not limited to those described.

The refrigeration apparatus in FIG. 1 includes a plurality of compressors 1a, 1b, and 1c (hereinafter simply referred to as the "compressors 1" when collectively referred to) and one accumulator 100 provided for the plurality of compressors 1. The refrigeration apparatus further includes, for example, a condenser, an expansion device, an evaporator, which are not illustrated, to form a refrigerant circuit through which refrigerant circulates. Although the accumulator 100 capable of handling three compressors is illustrated here, the number of handleable compressors is not limited to three, and may be two, or may be four or more.

The accumulator 100 includes a cylindrical container 2, an inlet pipe 3, a plurality of outlet pipes 4a, 4b, and 4c (hereinafter simply referred to as the "outlet pipes 4" when collectively referred to), and an oil return pipe 6. The outlet pipes 4a, 4b, and 4c are connected to suction pipes 5a, 5b, and 5c of the compressors 1a, 1b, and 1c.

Refrigerant in a mixed state of gas refrigerant, liquid refrigerant, and oil (hereinafter referred to as the gas-liquid mixed refrigerant) circulates into the accumulator 100 from a load side (an evaporator). The accumulator 100 separates this gas-liquid mixed refrigerant into gas refrigerant and liquid refrigerant containing oil. The gas refrigerant separated here is supplied to each of suction sides of the compressors 1a, 1b, and 1c via the respective outlet pipes 4a, 4b, and 4c. The liquid refrigerant containing oil is stored in the container 2. Further, the oil stored in the container 2 is returned to the compressors 1a, 1b, and 1c from later-described liquid return portions 7 (see FIG. 2) provided respectively to the outlet pipes 4a, 4b, and 4c. The gas refrigerant containing oil (hereinafter referred to as the oil-containing gas refrigerant) is therefore supplied to each of the compressors 1a, 1b, and 1c from the accumulator 100.

A structure of the accumulator 100 will be described in detail below.

Figure 2:
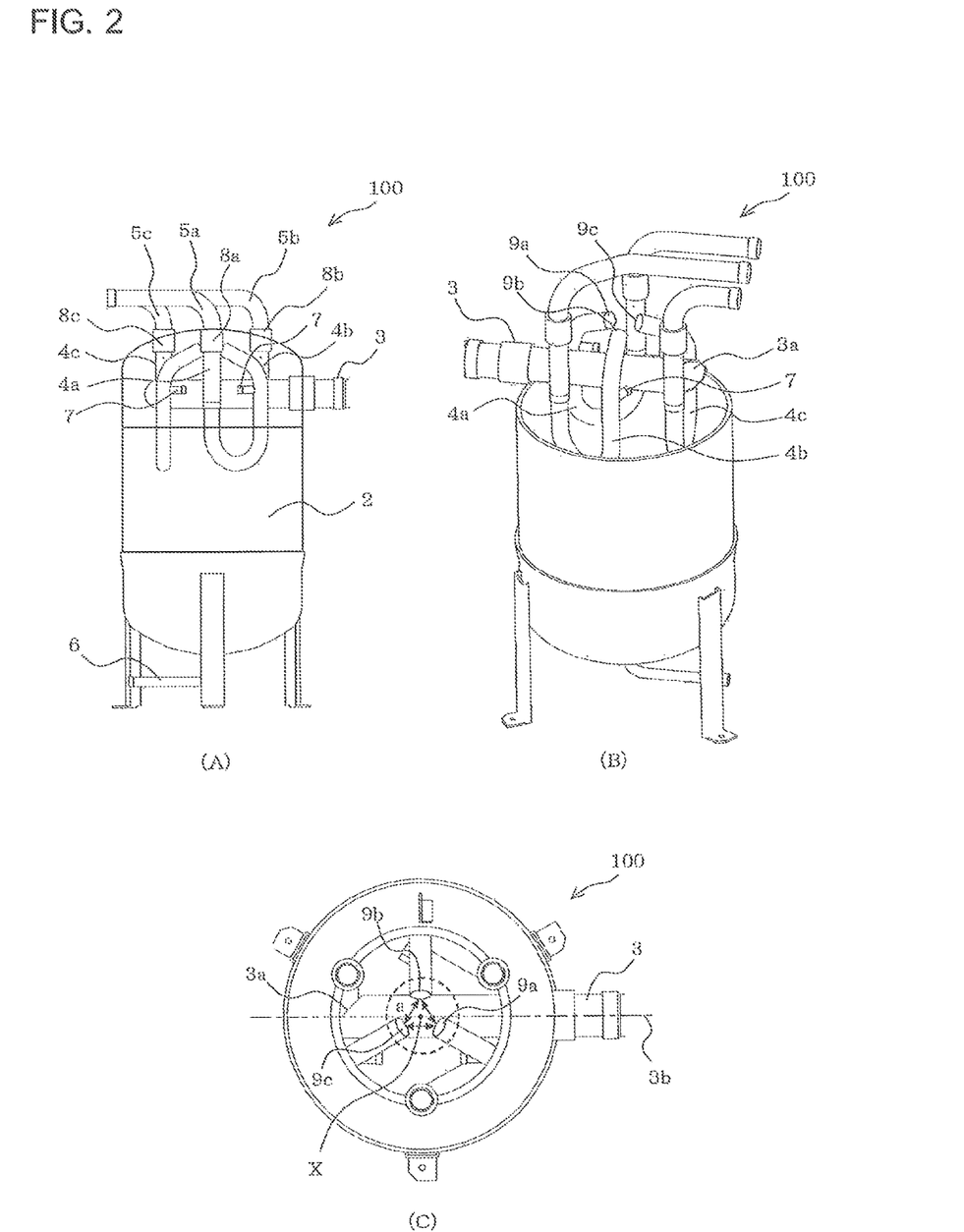
FIG. 2 is a diagram illustrating a configuration of the accumulator 100 according to Embodiment 1 of the present invention.

FIG. 2 is a diagram illustrating a configuration of the accumulator 100 according to Embodiment 1 of the present invention. FIG. 2(A) is a front view. FIG. 2(B) is a perspective view in which an upper container forming an upper side of the container 2 is removed. FIG. 2(C) is a transverse cross-sectional view.

The inlet pipe 3 is provided to penetrate the container 2 in a direction perpendicular to a central axis X thereof (horizontal direction). A leading end of the inlet pipe 3 located in the container 2 forms an inlet port 3a, from which the gas-liquid mixed refrigerant flows into the container 2. The inlet port 3a is positioned spaced from an inner circumferential surface 2a of the container 2 at a certain distance. Further, an end surface on the side of the inlet port 3a of the inlet pipe 3 forms an inclined surface inclined relative to a pipe axis 3b of the inlet pipe 3.

Each of the outlet pipes 4a, 4b, and 4c has a U-shape with one end located in the container 2 and the other end located in an upper part of the container 2. End portions on the side of the one ends of the outlet pipes 4a, 4b, and 4c located in the container 2 form outlet ports 9a, 9b, and 9c (hereinafter simply referred to as the "outlet ports 9" when collectively referred to). The gas refrigerant in the container 2 flows out from the outlet ports 9 toward the compressors 1a, 1b, and 1c. Further, the end portions on the side of the one ends of the outlet pipes 4a, 4b, and 4c are bent toward the central axis X. Each of the outlet ports 9a, 9b, and 9c is thereby concentrated in a central part of the container 2 (an area enclosed by a broken line in FIG. 2(C)), as illustrated in FIG. 2(B) and FIG. 2(C).

The end portions on the side of the one ends of the outlet pipes 4a, 4b, and 4c are bent toward the central axis X from respective positions spaced from one another at equal intervals on a circumference centering on the central axis X. Therefore, the outlet ports 9a, 9b, and 9c are configured to be disposed at equal intervals on a circumference centering on the central axis X. Herein, an interval a (see FIG. 2(C)) between mutually adjacent ones of the outlet ports 9a, 9b, and 9c is set to, for example, approximately 10 mm. If three or more compressors 1 are connected, the outlet ports 9 may be installed with the interval a of 10 mm or more in consideration of manufacturability.

Further, the outlet ports 9a, 9b, and 9c are located at a height position higher than the inlet pipe 3.

Further, the other ends of the outlet pipes 4a, 4b, and 4c are also disposed on a circumference centering on the central axis X of the container 2. The other ends of the outlet pipes 4a, 4b, and 4c are connected to the suction pipes 5a, 5b, and 5c via joint portions 8a, 8b, and 8c. Moreover, the outlet pipes 4a, 4b, and 4c include the liquid return portions 7 at the same height position. Furthermore, the oil return pipe 6 for returning the oil to the compressors 1 is connected to a lower part of the container 2.

Flows of the refrigerant and the oil in the accumulator 100 configured as described above will now be described based on FIG. 3 and FIG. 4.

Figure 3:
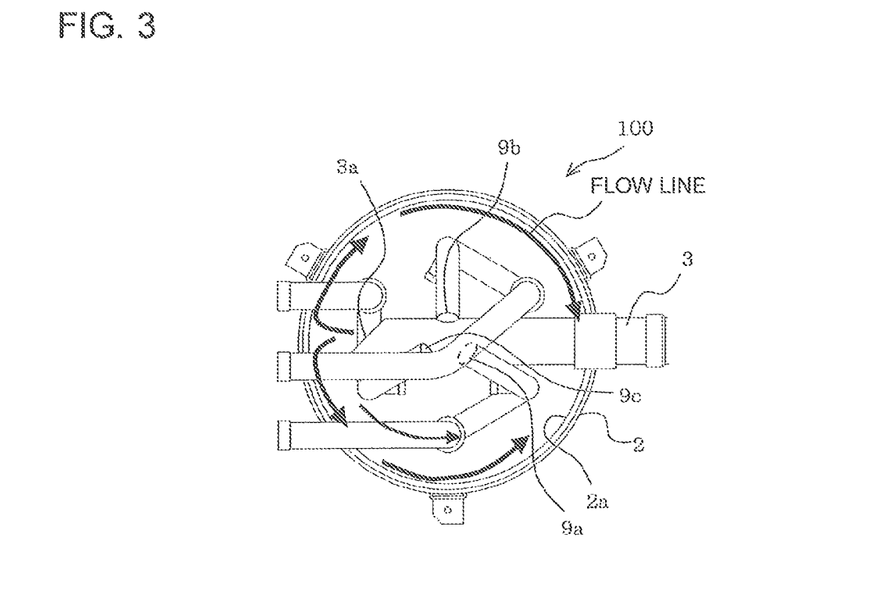
FIG. 3 is a diagram illustrating flow lines in the accumulator 100 according to Embodiment 1 of the present invention, in which a container 2 is viewed in a planar direction.
Figure 4:
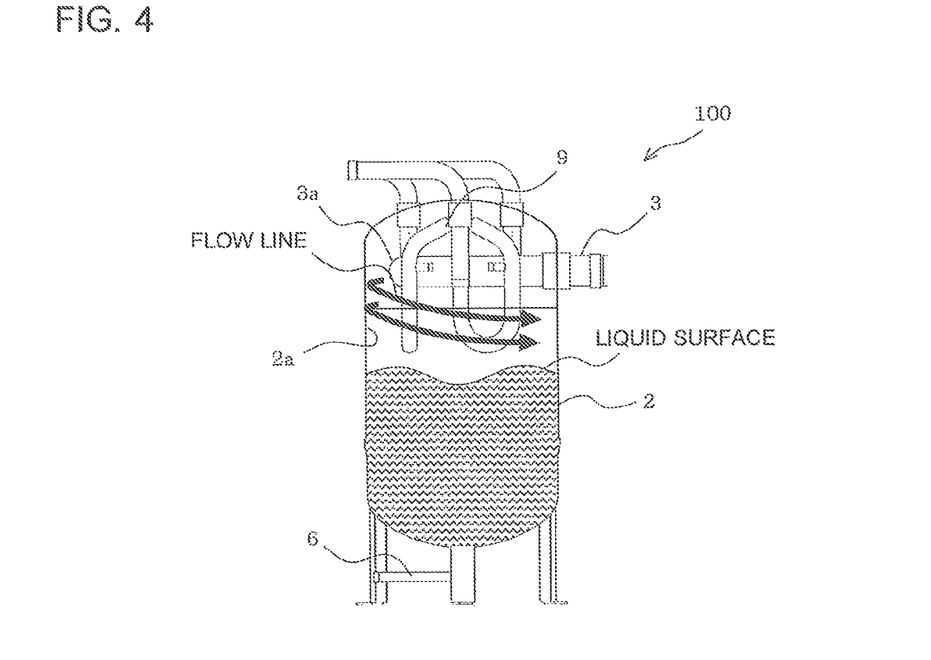
FIG. 4 is a diagram illustrating flow lines in the accumulator 100 according to Embodiment 1 of the present invention, in which the container 2 is viewed from a frontal direction.

FIG. 3 is a diagram illustrating flow lines in the accumulator 100 according to Embodiment 1 of the present invention, in which the container 2 is viewed in a planar direction. FIG. 4 is a diagram illustrating flow lines in the accumulator 100 according to Embodiment 1 of the present invention, in which the container 2 is viewed in a frontal direction.

The gas-liquid mixed refrigerant flowing out from the evaporator (not illustrated) of the refrigeration apparatus flows into the container 2 through the inlet pipe 3. Herein, the inlet pipe 3 is provided to penetrate the container 2 in the direction perpendicular to the central axis X thereof, as described above. The gas-liquid mixed refrigerant flowing into the container 2 from the inlet pipe 3 therefore hits against the inner circumferential surface 2a of the container 2.

The gas-liquid mixed refrigerant having hit against the inner circumferential surface 2a of the container 2 flows along the inner circumferential surface 2a of the container 2. The flow along the inner circumferential surface 2a of the container 2 divides into a flow in a circumferential direction and a flow in a downward direction, and eventually flows toward a bottom part of the container 2 due to the self-weight. Further, liquid droplets of the liquid refrigerant and liquid droplets of the oil contained in the gas-liquid mixed refrigerant disperse in mist form, drip down on the inner circumferential surface 2a of the container 2, and accumulate in the lower part of the container 2. Note that, the gas-liquid mixed refrigerant flowing into the container 2 through the inlet pipe 3 has a high flow velocity of, for example, approximately 13 to 15.5 (m/s), but is reduced in velocity due to the hitting against the inner circumferential surface 2a of the container 2. Thus the above-described gas-liquid separation is efficiently performed.

Moreover, with the reduction in velocity due to the hitting of the gas-liquid mixed refrigerant against the inner circumferential surface 2a, no swirl flow is generated in the container 2. Since no swirl flow is generated in the container 2, it is possible to restrain the gas-liquid mixed refrigerant from hitting directly against the liquid surface of a liquid mixture of the liquid refrigerant and the oil in the container 2. Further, although the flow of the gas-liquid mixed refrigerant flowing from the inlet pipe 3 is a turbulent liquid flow, since no swirl flow is generated in the container 2 as described above, it is possible to restrain the turbulence in the flow of the gas-liquid mixed refrigerant in the container 2. Accordingly, it is possible to restrain the occurrence of turbulence on the liquid surface (turbulent liquid surface) and a vortex in the liquid mixture of the liquid refrigerant and the oil stored in the container 2.

Then, since the liquid refrigerant and the oil subjected to the gas-liquid separation in the container 2 accumulate in the lower part of the container 2 as described above, almost only the gas refrigerant remains in an upper space inside the container 2. Herein, the outlet ports 9 of the outlet pipes 4 are concentrated in the center area higher than the inlet pipe 3, as described above. The gas-liquid mixed refrigerant flowing into the container 2 from the inlet port 3a is therefore not suctioned from the outlet ports 9. Accordingly, it is possible to eliminate a factor causing the variations in the outflow rates of the gas refrigerant flowing out of the outlet pipes 4, and restrain the variations.

Further, the oil accumulated at the height position of the liquid return portions 7 is suctioned from the liquid return portions 7 depending on the gas speed of the gas refrigerant suctioned from the outlet pipes 4, and is sent to the compressors 1 together with the gas refrigerant. If turbulence on the liquid surface and a vortex occur in this process, the amount of oil suctioned from the liquid return portions 7 is not stabilized, causing variations in the outflow rates of the oil flowing out of the outlet pipes 4. Embodiment 1, however, is capable of restraining the occurrence of turbulence on the liquid surface and a vortex, and thus restraining the variations in the outflow rates of the oil from the outlet pipes 4.

As a result of the above, it is possible to restrain the variations in the outflow rates of the oil-containing gas refrigerant from the outlet pipes 4.

As described above, according to Embodiment 1, the inlet pipe 3 is configured to penetrate the container 2 in the direction perpendicular to the central axis X thereof, and the respective outlet ports 9 of the outlet pipes 4 forming opening ports inside the container 2 are configured to be concentrated in the central part of the container 2. It is thereby possible to restrain the occurrence of a swirl flow in the container 2, and reduce the occurrence of turbulence on the liquid surface and a vortex in the accumulator. Consequently, it is possible to equally distribute the oil-containing gas refrigerant to each of the outlet pipes 4, restrain the variations in the outflow rates of the oil-containing gas refrigerant, and improve storage performance.

Embodiment 2

Figure 5:
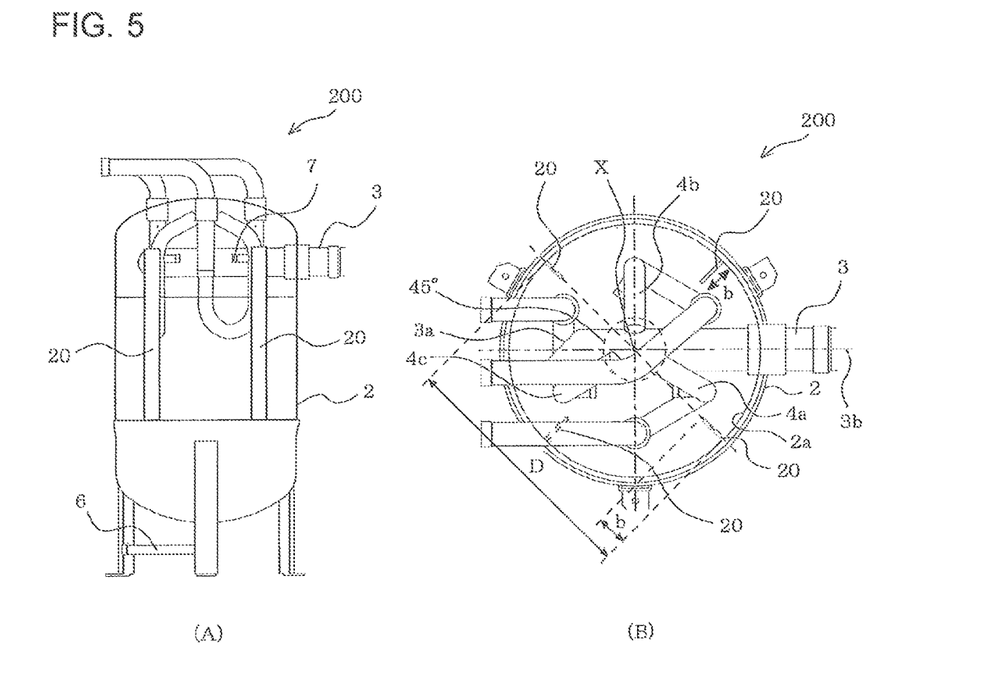
FIG. 5 is a diagram illustrating a configuration of an accumulator 200 according to Embodiment 2 of the present invention.

FIG. 5 is a diagram illustrating a configuration of an accumulator 200 according to Embodiment 2 of the present invention. FIG. 5(A) is a front view. FIG. 5(B) is a plan view in which the upper container forming the upper side of the container 2 is removed.

The accumulator 200 of Embodiment 2 has a configuration of the accumulator 100 of Embodiment 1 further provided with a plurality of baffle plates (blocking plates) 20. Embodiment 2 is similar to Embodiment 1 in the other configurations.

Each of the baffle plates 20 has a rectangular shape, and is stood on the inner circumferential surface 2a such that a long side of each of the baffle plates 20 is in contact with the inner circumferential surface 2a of the container 2. The baffle plates 20 are stood on the inner circumferential surface 2a at equal intervals in the circumferential direction and are oriented toward the center of the container 2. One of the baffle plates 20 is disposed at a position of an angle of 45 degrees to 90 degrees to the pipe axis 3b of the inlet pipe 3 from the side of the inlet port 3a. The remaining baffle plates 20 are disposed at equal intervals with reference to the position. Hereinafter, this baffle position serving as a reference will be referred to as the reference baffle position, and the angle of the baffle position will be referred to as the reference baffle angle. In the example of FIG. 5, one of four baffle plates 20 is disposed at a position of 45 degrees as a reference baffle angle, and the remaining three baffle plates 20 are provided at intervals of every 90 degrees from this reference baffle position. The number of baffle plates 20 is not limited to four, and for example may be two or three.

Further, when the diameter of the container 2 is represented as D, a width b of the baffle plate 20 in a short direction (standing direction) is configured to range from D/5 to D/12 from the viewpoint of a reduction in velocity of the gas-liquid mixed refrigerant.

Flows of the refrigerant and the oil in the accumulator 200 configured as described above will now be described based on FIG. 6 and FIG. 7.

Figure 6:
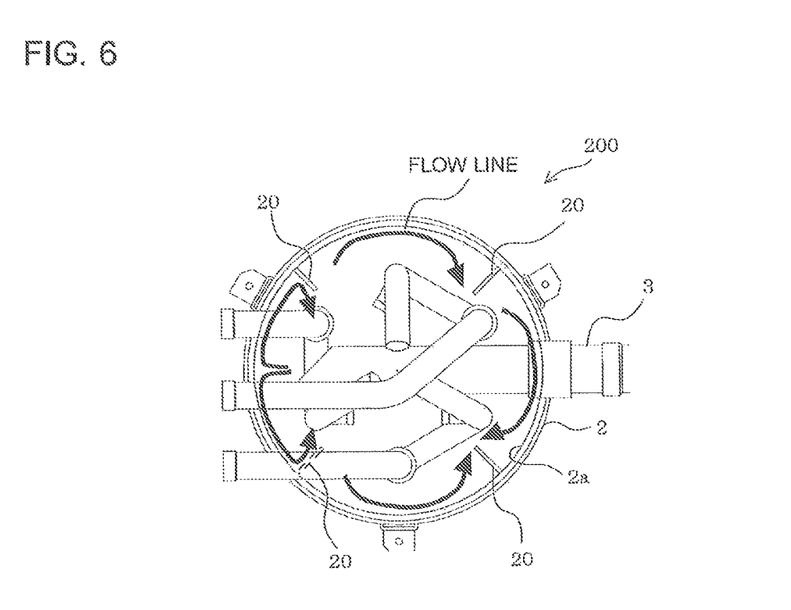
FIG. 6 is a diagram illustrating flow lines in the accumulator 200 according to Embodiment 2 of the present invention, in which the container 2 is viewed in the planar direction.
Figure 7:
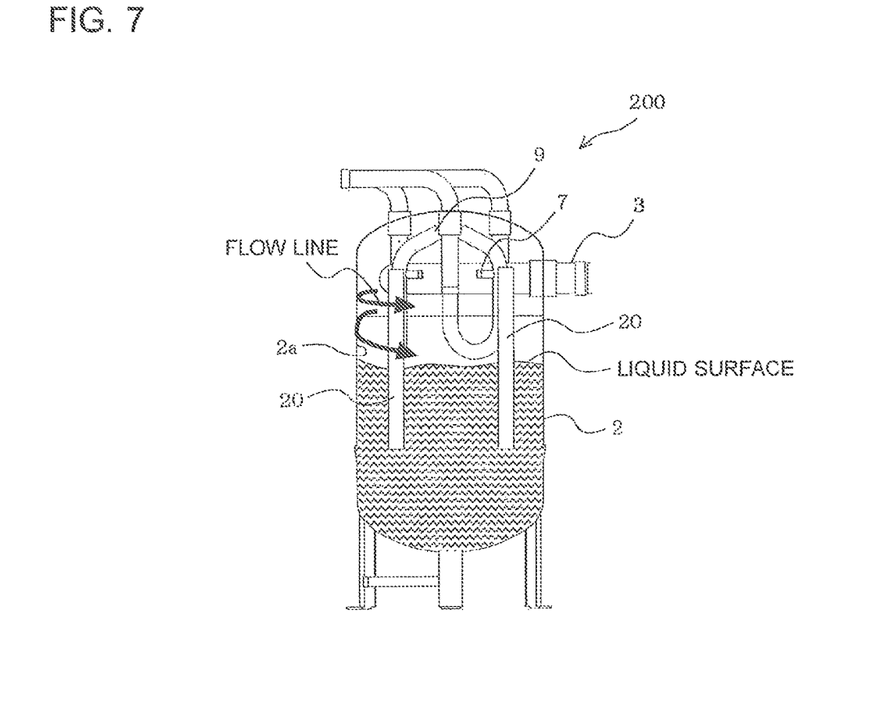
FIG. 7 is a diagram illustrating flow lines in the accumulator 200 according to Embodiment 2 of the present invention, in which the container 2 is viewed in the frontal direction.

FIG. 6 is a diagram illustrating flow lines in the accumulator 200 according to Embodiment 2 of the present invention, in which the container 2 is viewed in the planar direction. FIG. 7 is a diagram illustrating flow lines in the accumulator 200 according to Embodiment 2 of the present invention, in which the container 2 is viewed in the frontal direction. Since flows of the gas-liquid mixed refrigerant are roughly similar to those in Embodiment 1, the description herein will focus on the operation of the baffle plates 20.

The gas-liquid mixed refrigerant flowing into the container 2 hits against the inner circumferential surface 2a of the container 2, and thereafter forms a liquid flow in the circumferential direction along the inner circumferential surface 2a. This liquid flow of the gas-liquid mixed refrigerant hits against the baffle plates 20, and thus may be prevented from directly hitting against the liquid surface. Further, since the liquid flow of the gas-liquid mixed refrigerant is reduced in flow velocity by sequentially hitting against the plurality of baffle plates 20, the turbulence on the liquid surface is reduced. Since the flow velocity of the liquid flow of the gas-liquid mixed refrigerant is thus reduced, it is possible to restrain the occurrence of a vortex in the liquid mixture of the liquid refrigerant and the oil stored in the container 2, and stabilize the liquid surface.

Figure 8:
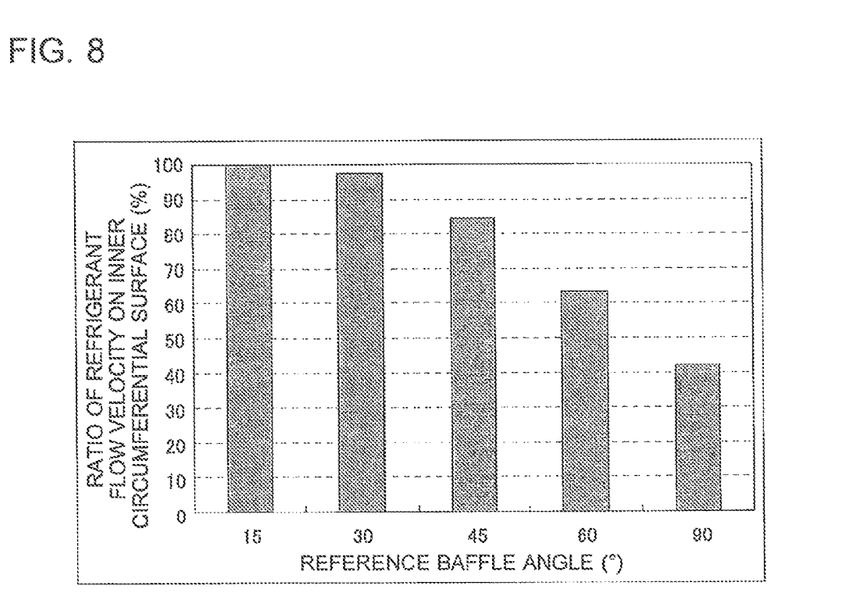
FIG. 8 is a bar graph illustrating a calculation result of the relationship between a reference baffle angle and a ratio of refrigerant flow velocity on an inner circumferential surface 2a in the accumulator 200 according to Embodiment 2 of the present invention.

FIG. 8, described below, illustrates a calculation result of a simulation having verified that the reference baffle angle set to 45 degrees to 90 degrees is effective in reducing the flow velocity of the gas-liquid mixed refrigerant. The conditions used in the calculation are as follows: 1700 kg/h of a refrigerant circulation amount and 18 degrees Celsius of a temperature of the gas-liquid mixed refrigerant suctioned into the container 2.

FIG. 8 is a bar graph illustrating a calculation result of the relationship between the reference baffle angle and a ratio of refrigerant flow velocity on the inner circumferential surface 2a in the accumulator 200 according to Embodiment 2 of the present invention. Herein, one baffle plate 20 was installed with the reference baffle angle sequentially changed, and the refrigerant flow velocity on the inner circumferential surface 2a of the container 2 was calculated for each of the changes. In FIG. 8, the horizontal axis represents the reference baffle angle (degrees). The vertical axis represents the ratio of the calculated refrigerant flow velocity to the maximum flow velocity of the gas-liquid mixed refrigerant from the inlet pipe 3 (a velocity reduction effect) (%).

It is considered that a reference baffle angle of 30 degrees or less makes the space between the baffle plate 20 and the inlet pipe 3 too narrow, thereby adversely affecting the liquid flow of the gas-liquid mixed refrigerant and aggravating the turbulence on the liquid surface. Consequently, the refrigerant flow velocity is not sufficiently reduced. Meanwhile, the reference baffle angle set to 45 degrees to 90 degrees results in a velocity reduction effect of 84% or less, sufficiently exerting the effect of reducing the refrigerant flow velocity.

Further, the length b in the short direction of each of the baffle plates 20 is set to D/5 to D/12 for the following reason. In Embodiment 2, the baffle plates 20 are provided to stabilize the liquid surface with a view of eliminating a swirl or a vortex, similarly as in a so-called stirring tank. In designing of baffles in a stirring tank, the above-described dimensional ratio is a commonly used optimal baffle dimensional ratio. The above-described dimensional ratio is therefore adopted also in Embodiment 2.

As described above, according to Embodiment 2, it is possible to obtain similar effects to those of Embodiment 1, and further reduce the occurrence of turbulence on the liquid surface and a vortex in the container 2 of the accumulator 200 because of the baffle plates 20 installed to the inner circumferential surface 2a of the container 2. Consequently, Embodiment 2 is capable of further restraining the variations in the outflow rates of the oil-containing gas refrigerant from the outlet pipes 4 and improving the storage performance, as compared with Embodiment 1.

Embodiment 3

Figure 9:
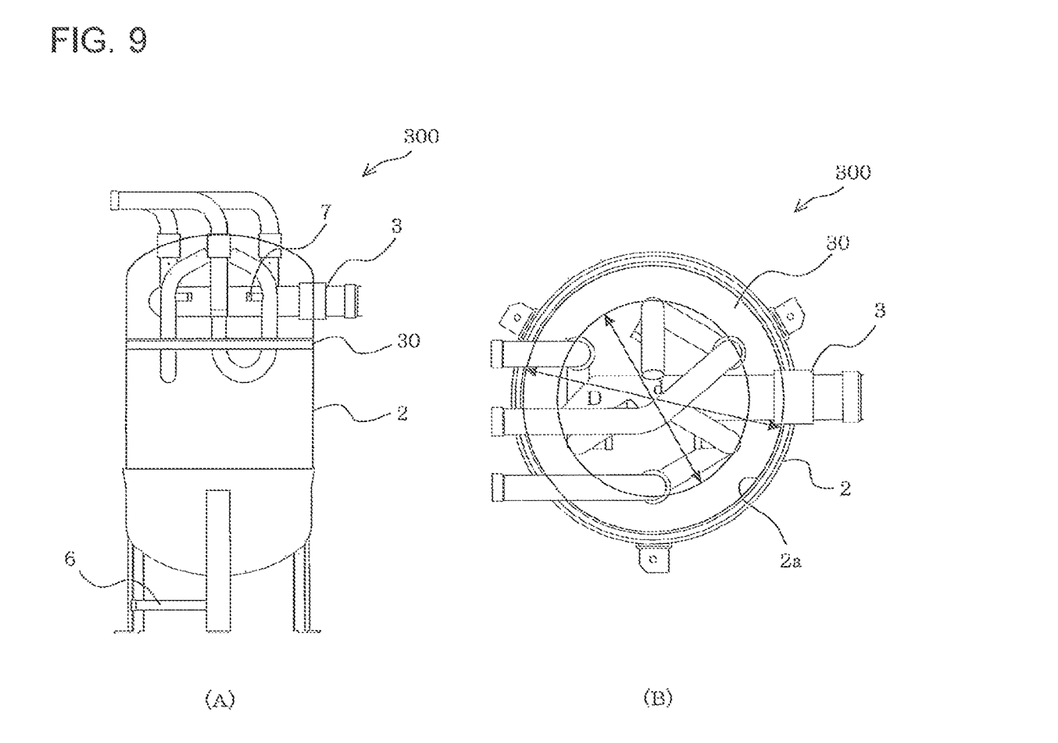
FIG. 9 is a diagram illustrating a configuration of an accumulator 300 according to Embodiment 3 of the present invention.

FIG. 9 is a diagram illustrating a configuration of an accumulator 300 according to Embodiment 3 of the present invention. FIG. 9(A) is a front view. FIG. 9(B) is a plan view in which the upper container forming the upper side of the container 2 is removed.

The accumulator 300 of Embodiment 3 has a configuration of the accumulator 100 of Embodiment 1 further provided with a cover plate 30. Embodiment 3 is similar to Embodiment 1 in the other configurations.

The cover plate 30 has a doughnut shape, and is installed such that the outer circumference of the cover plate 30 is in contact with the inner circumferential surface 2a of the container 2. The cover plate 30 is installed at a position lower than the inlet pipe 3 and the liquid return portions 7 provided to the outlet pipes 4. Further, when the diameter of the container 2 is represented as D, an inner diameter d of the cover plate 30 is configured to range from 3D/5 to 4D/5 from the viewpoint of a reduction in velocity of the gas-liquid mixed refrigerant. In other words, the ratio of the inner diameter d of the cover plate 30 to the diameter D of the container 2 is set to a range from 0.6 to 0.8.

Flows of the refrigerant and the oil in the accumulator 300 configured as described above will now be described based on FIG. 10 and FIG. 11.

Figure 10:
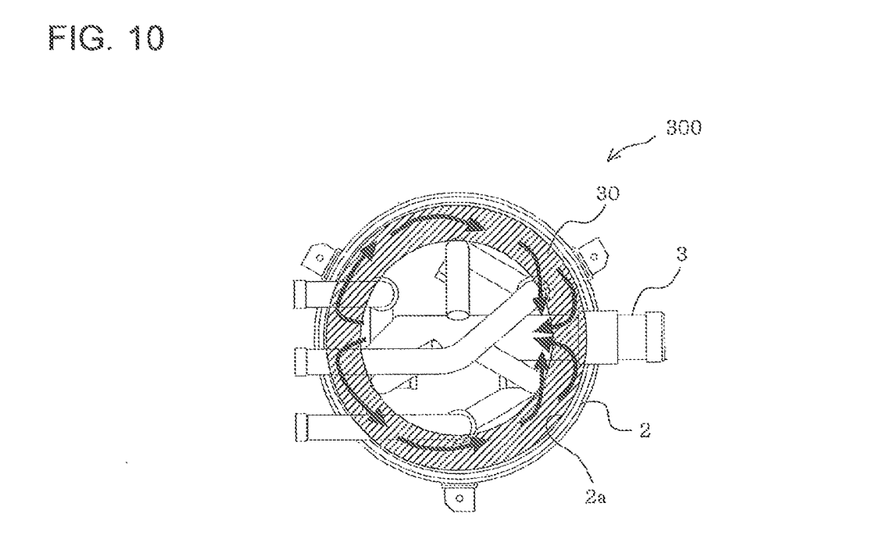
FIG. 10 is a diagram illustrating flow lines in the accumulator 300 according to Embodiment 3 of the present invention, in which the container 2 is viewed in the planar direction.
Figure 11:
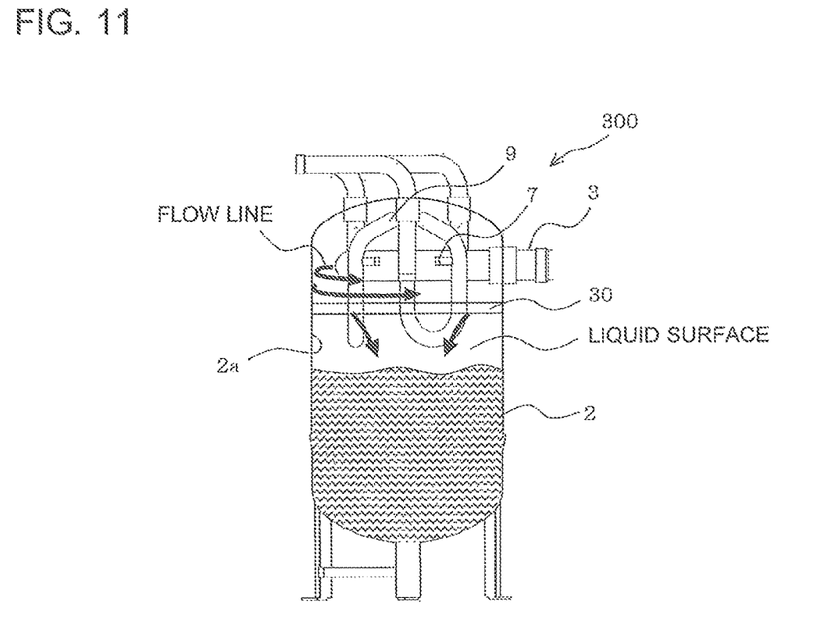
FIG. 11 is a diagram illustrating flow lines in the accumulator 300 according to Embodiment 3 of the present invention, in which the container 2 is viewed in the frontal direction.

FIG. 10 is a diagram illustrating flow lines in the accumulator 300 according to Embodiment 3 of the present invention, in which the container 2 is viewed in the planar direction. FIG. 11 is a diagram illustrating flow lines in the accumulator 300 according to Embodiment 3 of the present invention, in which the container 2 is viewed in the frontal direction. Since flows of the gas-liquid mixed refrigerant are roughly similar to those in Embodiment 1, the description herein will focus on the operation of the cover plate 30.

The gas-liquid mixed refrigerant flowing into the container 2 hits against the inner circumferential surface 2a of the container 2, and thereafter divides into a liquid flow in the circumferential direction along the inner circumferential surface 2a and a liquid flow in the downward direction. The liquid flow in the downward direction hits against the cover plate 30, and thus may be prevented from directly hitting against the liquid surface of the refrigerant. Further, since the liquid flow of the gas-liquid mixed refrigerant flows along the cover plate 30 and then flows toward the bottom part of the container 2, it is possible to reduce the turbulence on the liquid surface. Moreover, it is possible to reduce the flow velocity of the liquid flow of the gas-liquid mixed refrigerant, and thus restrain the occurrence of a vortex in the liquid mixture of the liquid refrigerant and the oil stored in the container 2 and stabilize the liquid surface.

Figure 12:
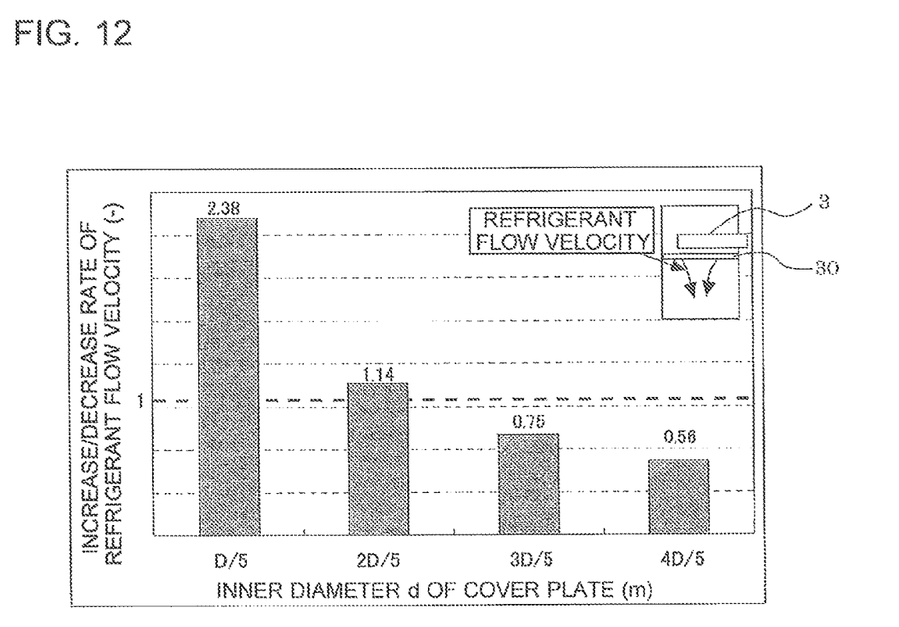
FIG. 12 is a bar graph illustrating a calculation result of the relationship between a refrigerant flow velocity and an inner diameter d of a cover plate 30 relative to a diameter D of the container 2 in the accumulator 300 according to Embodiment 3 of the present invention.

FIG. 12 described below illustrates a calculation result of a simulation having verified that the inner diameter d of the cover plate 30 set to 3D/5 to 4D/5 is effective in reducing the flow velocity of the gas-liquid mixed refrigerant. The conditions used in the calculation are same as described above and as follows: 1700 kg/h of a refrigerant circulation amount and 18 degrees Celsius of a temperature of the gas-liquid mixed refrigerant suctioned into the container 2.

FIG. 12 is a bar graph illustrating a calculation result of the relationship between the inner diameter d of the cover plate 30 and the refrigerant flow velocity in the accumulator 300 according to Embodiment 3 of the present invention. Herein, the cover plate 30 was installed with the inner diameter d thereof sequentially changed, and the refrigerant flow velocity on the inner circumferential surface 2a below the cover plate 30 was calculated for each of the changes. In FIG. 12, the horizontal axis represents the inner diameter d (m) of the cover plate 30. The vertical axis represents an increase/decrease ratio of refrigerant flow velocity (−), which is the ratio of the calculated refrigerant flow velocity to the maximum flow velocity of the gas-liquid mixed refrigerant from the inlet pipe 3.

If the inner diameter d of the cover plate 30 is 2D/5 or less, the increase/decrease ratio of refrigerant flow velocity exceeds one. That is, the refrigerant flow velocity on the inner circumferential surface 2a below the cover plate 30 exceeds the maximum flow velocity of the gas-liquid mixed refrigerant from the inlet pipe 3. If the inner diameter d of the cover plate 30 ranges from 3D/5 to 4D/5, however, the increase/decrease ratio of refrigerant flow velocity is one or less, and the refrigerant flow velocity on the inner circumferential surface 2a below the cover plate 30 is lower than the maximum flow velocity of the gas-liquid mixed refrigerant from the inlet pipe 3. Accordingly, the effect of reducing the refrigerant flow velocity is sufficiently exerted.

As described above, according to Embodiment 3, it is possible to obtain similar effects to those of Embodiment 1, and further reduce the occurrence of turbulence on the liquid surface and a vortex in the container 2 of the accumulator 300 because of the cover plate 30 installed to the inner circumferential surface 2a of the container 2. Consequently, Embodiment 3 is capable of further restraining the variations in the outflow rates of the oil-containing gas refrigerant and improving the storage performance, as compared with Embodiment 1.

The invention claimed is:

1. An accumulator that is used in a refrigeration apparatus including a plurality of compressors and is provided for the plurality of compressors, the accumulator comprising:

an inlet pipe that penetrates a cylindrical container perpendicularly to a central axis of the cylindrical container, intersects with the central axis of the cylindrical container and conveys gas-liquid mixed refrigerant into the container, wherein an axial direction of substantially an entirety of the inlet pipe within the cylindrical container is perpendicular to the central axis; and a plurality of outlet pipes connected to respective suction sides of the plurality of compressors, wherein the plurality of outlet pipes each have one end located in the container and forming an outlet port for conveying gas refrigerant in the container toward the plurality of compressors, and wherein the outlet port of each of the plurality of outlet pipes is concentrated in a central part of the container.

2. An accumulator that is used in a refrigeration apparatus including a plurality of compressors and is provided for the plurality of compressors, the accumulator comprising:

an inlet pipe that penetrates a cylindrical container perpendicularly to a central axis of the cylindrical container, intersects with the central axis of the cylindrical container and conveys gas-liquid mixed refrigerant into the container; and a plurality of outlet pipes connected to respective suction sides of the plurality of compressors, wherein the plurality of outlet pipes each have one end located in the container and forming an outlet port for conveying gas refrigerant in the container toward the plurality of compressors, wherein the outlet port of each of the plurality of outlet pipes is concentrated in a central part of the container, and wherein each of the plurality of outlet pipes is formed in a U-shape, an other end opposite to the one end is located in an upper part of the container, and the one end of each of the plurality of outlet pipes is bent toward the central axis to dispose the outlet port in the central part of the container.

3. The accumulator of claim 2, wherein at least one baffle plate blocking a flow of the gas-liquid mixed refrigerant flowing into the container from the inlet pipe is stood on an inner circumferential surface of the container.

4. The accumulator of claim 3, wherein the at least one baffle plate comprises a plurality of baffle plates, and the plurality of baffle plates are stood on the inner circumferential surface of the container at equal intervals in a circumferential direction.

5. The accumulator of claim 4, wherein the at least one baffle plate is formed in a rectangular shape and stood on the inner circumferential surface of the container with a long side of the at least one baffle plate being in contact with the inner circumferential surface of the container.

6. The accumulator of claim 4, wherein one of the plurality of baffle plates is disposed at a reference baffle position that is a position of an angle of 45 degrees to 90 degrees to a pipe axis of the inlet pipe from a side of an inlet port of the inlet pipe opened in the container, and one or more remaining baffle plates of the plurality of baffle plates are disposed at equal intervals with respect to adjacent baffle plates from the reference baffle position.

7. The accumulator of claim 3, wherein, when a diameter of the container is represented as D, a width in a standing direction of the at least one baffle plate is set to range from D/5 to D/12.

8. The accumulator of claim 2, wherein a cover plate having a doughnut shape is provided with an outer circumference of the cover plate being in contact with an inner circumferential surface of the container.

9. The accumulator of claim 8, wherein, when a diameter of the container is represented as D, an inner diameter of the cover plate is set to range from 3/5×D to 4/5×D.

10. A refrigeration apparatus comprising the accumulator of claim 1.

11. A refrigeration apparatus comprising the accumulator of claim 2.

* * * * *